United States Patent [19]

Hills

[11] Patent Number: 5,045,857

[45] Date of Patent: Sep. 3, 1991

[54] HIGH-SPEED BEAM SWITCHING PROCESSOR

[75] Inventor: Richard A. Hills, LaMesa, Calif.

[73] Assignee: The United States of America as represented by the Secretary of the Navy, Washington, D.C.

[21] Appl. No.: 517,354

[22] Filed: Oct. 23, 1974

Related U.S. Application Data

[63] Continuation-in-part of Ser. No. 329,262, Jan. 15, 1973, Pat. No. 4,472,719.

[51] Int. Cl.[5] ................................................ G01S 7/38
[52] U.S. Cl. ...................................... 342/374; 342/14;
328/137; 328/154
[58] Field of Search ............... 343/18 E; 328/116, 137, 328/147, 154; 342/14, 17, 374

[56] References Cited

U.S. PATENT DOCUMENTS

| | | | |
|---|---|---|---|
| 2,862,204 | 11/1958 | Henrici et al. | 343/18 E X |
| 3,619,791 | 11/1971 | Moreines | 328/137 X |
| 3,879,732 | 4/1975 | Simpson | 343/18 E |
| 4,369,445 | 1/1983 | Evans et al. | 342/17 |

Primary Examiner—T. H. Tubbesing
Attorney, Agent, or Firm—Harvey Fendelman; Thomas Glenn Keough; J. W. McLaren

[57] ABSTRACT

A beam switching processor operable to detect a microwave amplitude distribution associated with an array of receiving antenna ports and to close a single-pole, multiple-throw microwave switch to that port in a matched array of transmit antenna ports which corresponds to the receiving antenna port having the maximum signal amplitude. The receive antenna signals are log amplified and subsequently processed in a logic section which indentifies the input port having the highest energy level and energizes the corresponding microstrip switch-driver circuit.

10 Claims, 3 Drawing Sheets

HIGH-SPEED BEAM SWITCHING PROCESSOR

CROSS REFERENCES TO RELATED APPLICATIONS

This application is a continuation-in-part of application Ser. No. 329,262 filed Jan. 15, 1973, in the name of the present inventor, now U.S. Pat. No. 4,472,719.

BACKGROUND OF THE INVENTION

The rapidly increasing missile threat to surface vessels has resulted in a critical need for improved ECM antennas. Specifically, existing missile threats to surface ships has created a requirement that ECM increase radiated power and simultaneously counter threat signals which are separated in azimuth. Existing ECM antennas comprised of semi-omni antennas cannot radiate the effective powers desired when fed with existing amplifiers. Other ECM antennas are single beam directed antennas which require an operator to steer the beam to a threat sector. Multiple beam antennas have been developed but weight restrictions for small ships limit their utility. Also, millisecond beam switching time limits the multiple target response to a prediction gating program for known threat signals. Response to multiple threats of unknown signals is accommodated by feeding beams in parallel, thereby reducing the effective radiated power. Phased array technology offers the advantages of electronically scanned, high gain beams but the resultant narrow beam with its associated high effective power is extremely sensitive to directional error. Although milliradian beam control is straightforward, the absolute alignment of the transmit beam axis with a bearing axis determined by an independent measurement of a single pulse is subject to error. This error severly degrades the effective radiated power of a pencil beam at the target location thereby imposing a high technical risk for such an approach.

Copending patent application Ser. No. 329,262 filed Jan. 15, 1973 in the name of the present inventor discloses an ECM, multiple-target, retro-directive antenna (MTRA) which overcomes the above disadvantages. A critical element in the MTRA is the beam switching processor, which must select and switch a medium-power transmit signal within 100 nanoseconds of target signal arrival.

SUMMARY OF THE INVENTION

The present invention relates to a beam switching processor capable of selecting and switching a transmit signal within 100 nanoseconds of target signal arrival particularly useful with the MTRA apparatus disclosed in parent application Ser. No. 329,262 incorporated herein by reference. The processor comprises three assemblies; a log video detector amplifier, a logic processor, and a microwave switch-driver assembly. The log video detector amplifier comprises an rf detector and a wide-bandwidth temperature-compensated logarithmic amplifier to provide increased dynamic range for the apparatus. The logic processor functions to quantize, according to amplitude, synchronous video pulse signals originating from the log video detector amplifier section and generates a parallel binary signal equal in duration to the video signal. The binary signal has one and only one unique bit, the order of which identifies the interfacing video signal having the maximum amplitude. The logic processor interfaces with the microwave switch-driver section which functions to switch an rf signal, connected to a single input port, to one of a plurality of output ports. Switching is accomplished by forward and reverse biasing appropriate diodes in a strip line circuit.

STATEMENT OF THE OBJECTS OF THE INVENTION

It is the primary object of the present invention to provide a novel beam switching processor.

It is another object of the present invention to disclose a processor which is capable of selecting and switching a transmit signal within 100 nanoseconds of target signal arrival.

It is another object of the present invention to disclose a novel apparatus for detecting a microwave amplitude distribution associated with an array of receiving antenna ports and for energizing that port in a matched array of transmit antenna ports which corresponds to the receiving antenna port having the maximum amplitude.

Other objects, advantages and novel features of the invention will become apparent from the following detailed description of the invention when considered in conjunction with the accompanying drawings.

DESCRIPTION OF THE PREFERRED EMBODIMENT

Figure 1:
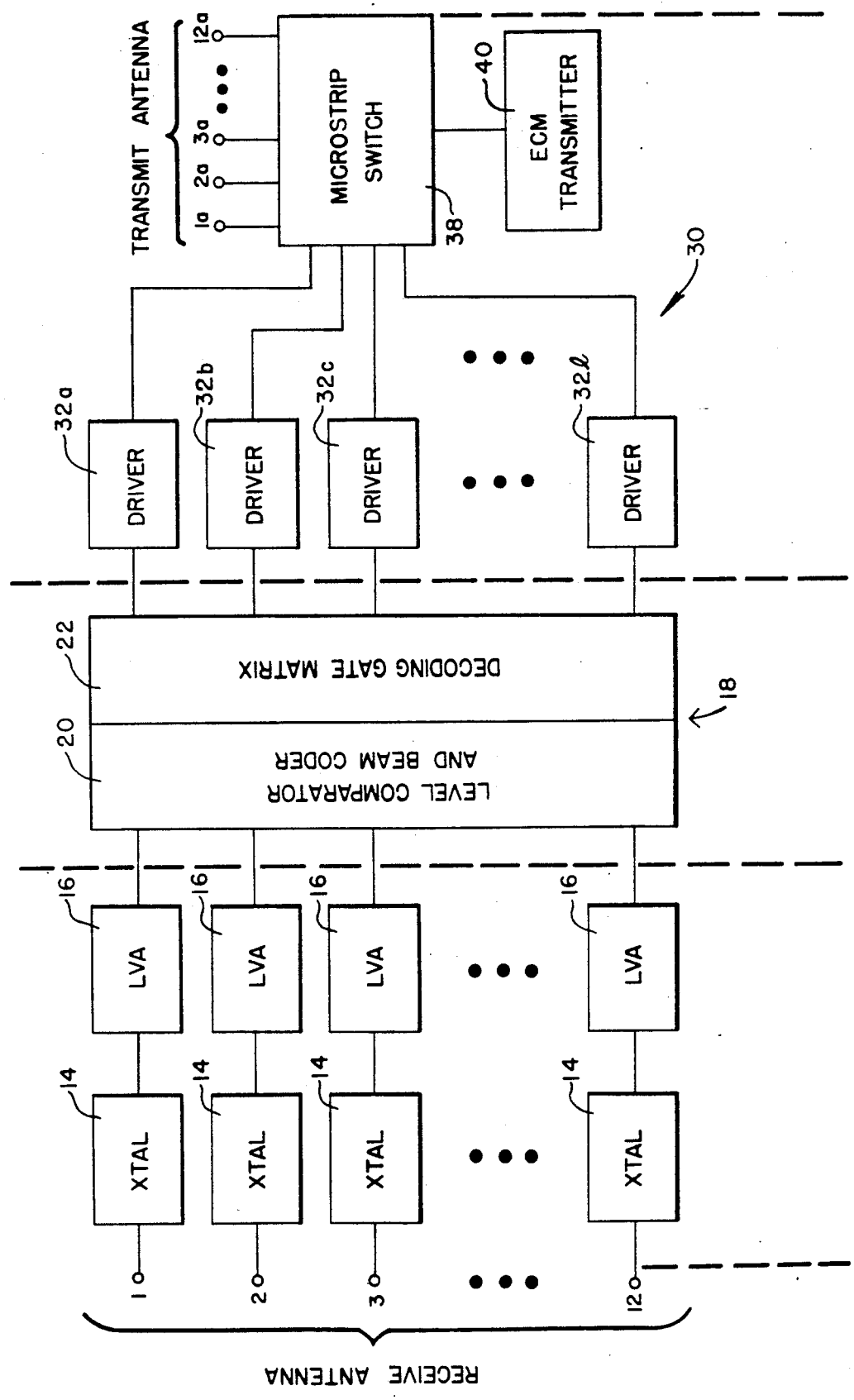
FIG. 1 is a schematic diagram of the beam switching processor of the present invention.

The beam switching processor of the present invention, as illustrated in FIG. 1, is divided into three assemblies according to function; a log video detector amplifier, a logic processor, and a microwave switch-driver assembly. The log video detector amplifier section consists of twelve crystal detectors 14, which may, for example, be high sensitivity, broadband Schottky-barrier diodes with rf limiters preceding the diode to prevent burnout, connected to each receive antenna port 1, 2, 3, ..., 12 and twelve log video amplifiers 16 connected to each crystal detector 14. Suitable log video amplifiers are models AL5040, AL8040, AL5070, or AL50144 manufactured by American Astrionics, Inc., a subsidiary of Technicolor, Inc., Hollywood, Calif. Each crystal detector 14 and log video amplifier 16 functions to detect rf signals at its respective receive antenna port and to supply a video voltage to the logic processor 18.

The rf detectors are selected for matched response and are biased for identical input threshold response. Each logarithmic amplifier-detector combination is calibrated to match a common transfer function. Consequently, low level input signals are amplified uniformly and sufficiently to drive the logic processor throughout the intended dynamic range of input signal level. Through matching and calibration, the quality of relative amplitude between the input ports is retained.

Figure 2:
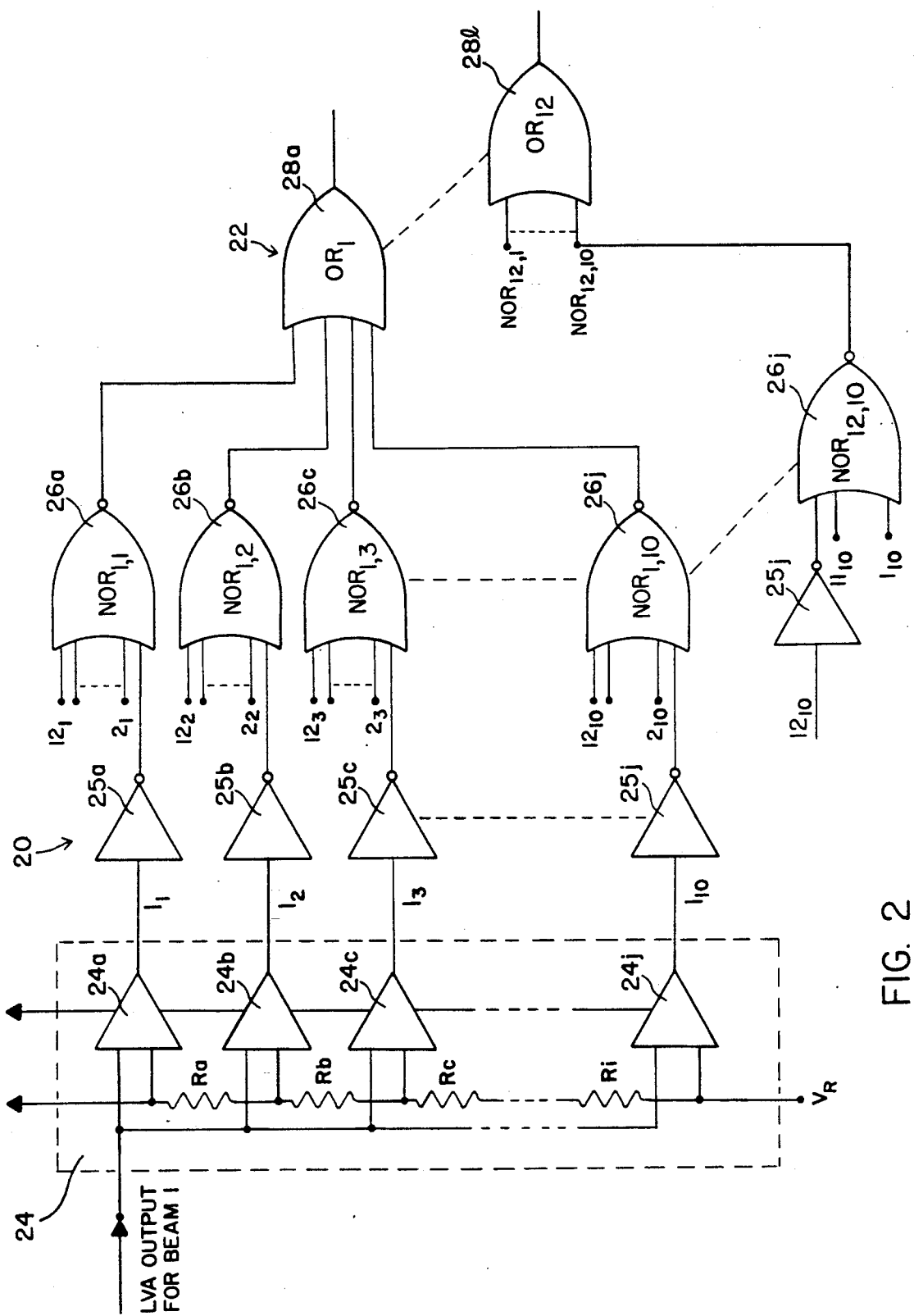
FIG. 2 is a schematic diagram of the level comparator, beam coder and decoding gate matrix portions of the logic processor of the present invention.
Figures 3, 4:
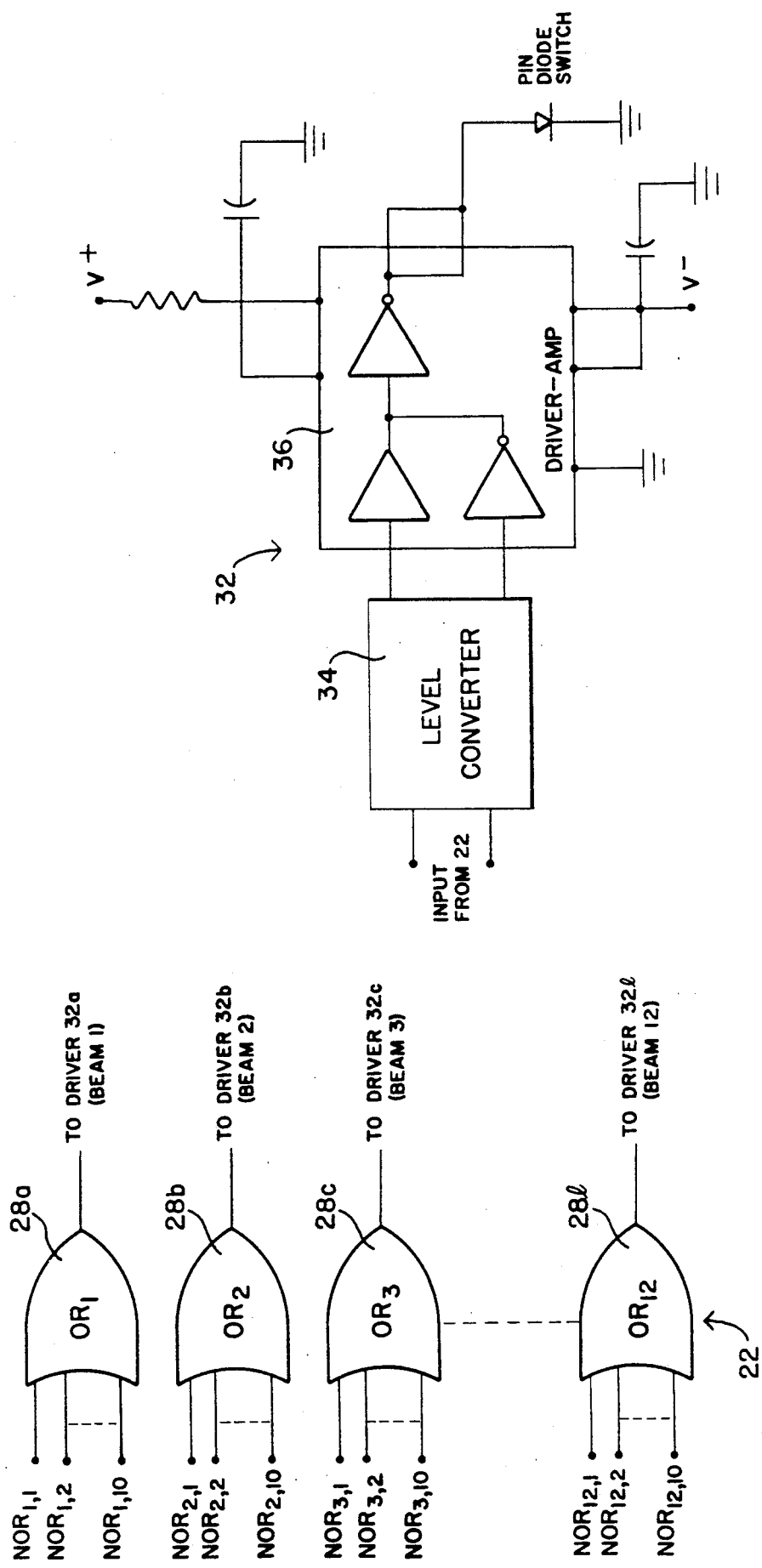
FIG. 3 is a schematic diagram of the decoding gate matrix of the logic processor of the present invention.
FIG. 4 is a schematic diagram of the microstrip switch driver of the present invention.

The logic processor 18 comprises a level comparator, a beam coder, and a decoding gate matrix. The level comparator and beam coder of the logic processor 18 are illustrated in FIG. 2. The level comparator 24 is connected to form an $M \times N$ matrix, where M, the number of matrix rows, is the number of reference voltage levels utilized and N, the number of matrix columns, is the number of receive antenna ports in the system. In the embodiment illustrated in FIG. 2, ten reference levels are provided by reference voltage $V_R$ and resistors $R_a$, $R_b$, $R_c$, ..., and $R_j$ which are connected as illustrated in FIG. 2 to the reference voltage inputs of the ten comparators 24a, 24b, 24c, ..., and 24j. The signal from receive antenna port 1 is thus compared against the ten reference voltage levels such that the output of each comparator changes from a logic 0 to a logic 1 when the video signal level connected to its column input exceeds the reference voltage connected to its row input. As a result, the output of the comparator can be visualized as an $M \times N$ matrix, $10 \times 12$ in the present embodiment, of binary entries in which each entry, starting with the lowest reference voltage row and progressing to the highest, switches to a logic 1 as the input video signal level increases. An identical comparator network 24 is connected to each of the eleven remaining log video amplifier outputs (not shown) whereby 120 of the identical comparators 24a, 24b, 24c, ..., 24j would be used in the present illustrated embodiment. It is to be understood that the present invention is not limited to a $10 \times 12$ matrix and that any suitable number of beams and reference levels could be used. The notations $1_1$, $1_2$, $1_3$, ..., $1_{10}$ indicate beam number 1, reference level 1; beam number 1, reference level 2, etc. The output of each of the comparators 24a, 24b, ..., 24j in the comparator network 24 is connected through a corresponding inverter 25a, 25b, ..., 25j to one of the inputs of the NOR gates 26a, 26b, 26c, ..., 26j as illustrated. The other $N-1$ inputs to each of the NOR gates is derived from the other $N-1$ comparator network outputs without inversion. The notations $NOR_{1,1}$, $NOR_{1,2}$, $NOR_{1,3}$, ..., $NOR_{1,10}$, ..., $NOR_{12,10}$ are used to denote the particular NOR gate in the $10 \times 12$ matrix such that the subscript 1,1 indicates beam 1 level 1; 1, 2 indicates beam 1 level 2; 1, 3 indicates beam 1 level 3; 1, 10 indicates beam 1 level 10; and 12, 10 indicates beam 12 level 10. Thus, ten, twelve-input NOR gates are utilized for each receive antenna port resulting in a total of 120 NOR gates in the illustrated embodiment. The decoding gate matrix comprises 12 inclusive OR gates 28a, 28b, 28c, ..., 28l, two of which are shown in FIG. 2. The inputs of each inclusive OR gate 28 are connected to corresponding column outputs of ten NOR gates associated with each of the 12 receive antenna beams. This connection is also illustrated in FIG. 3.

The logic processor logic gates process and code the binary signal output from the comparators 24 in the following manner. Each of the NOR gates enables a logic 1 at its output when and only when all of its inputs are logic 0's. Assume, for example, that beam 1 and only beam 1 has exceeded reference levels 1, 2, and 3, that beam 2 has exceeded reference levels 1 and 2 and that no other beams have exceeded any reference levels. Inverters 25a, 25b and 25c will have received logic 1's at their inputs from comparators 24a, 24b and 24c and will provide logic 0's to the inputs of the NOR gates $NOR_{1,1}$, $NOR_{1,2}$ and $NOR_{1,3}$. Gates $NOR_{1,1}$ and $NOR_{1,2}$ will have thus received one logic 1 at their inputs from the beam 2 comparators and will accordingly provide no output. NOR gate $NOR_{1,3}$ will have received all binary 0's at its inputs and, therefore, will produce a binary 1 at its output. Accordingly, the inclusive OR gate 28a will have received a binary 1 at its input and will, thereby, enable a binary 1 at its output, providing an indication that receive antenna port 1 had the highest signal amplitude. In the example given, NOR gates $NOR_{2,1}$ and $NOR_{2,2}$ would not enable logic 1's at their outputs since they would have received logic 1's at their inputs from the beam 1 comparators. Similarly, none of the other remaining NOR gates would enable logic 1's. It should be noted that it is an implicit assumption in the present invention that the highest reference level exceeded is exceeded by the signal from one and only one of the 12 receiving antenna ports. Thus, the logic processor functions to determine the highest reference level exceeded and to code the receive antenna beam which exceeded that reference level.

The microwave switch-driver assembly 30 is made up of two units, the driver group and the microstrip switch. The driver group as illustrated in FIG. 1 consists of twelve identical PIN diode switch-driver circuits 32a, 32b, 32c, ..., 32l which are driven by the 12-bit output signal from the logic processor. A single PIN diode switch-driver is illustrated in FIG. 4 wherein it is seen that level converter 34 is connected to decoding gate matrix 22 for converting the decoding gate 22 logic levels to appropriate levels for the driver amplifier 36. The driver amplifier may comprise, for example, a National Semiconductor DH0035 PIN driver amplifier. The driver amplifier 36 is illustrated in FIG. 4 as connected for a grounded-cathode PIN diode switch design. Each of the driver amplifiers 36 is connected to the microstrip switch 38. The microwave switch-driver assembly 30 thereby functions to switch an rf signal from ECM transmitter 40 which is connected to a single input port to one of 12 output ports 1a, 2a, 3a, ..., 12a which are connected to the transmit antenna. Switching is accomplished by forward and reverse biasing appropriate diodes in the microstrip switch 38 by known techniques. A suitable microstrip switch is model MA8306-241SD manufactured by Microwave Associates, Inc., Burlington, Me. which switch is a single pole 24 throw (SP24T) switch. Alternatively, three SP4T switches fed by a SP3T switch or any other SP12T microstrip switch with the desired switching time could be used.

Thus, a novel beam switching processor has been disclosed which is capable of selecting and switching a transmit signal within 100 nanoseconds of an input target signal. The processor of the present invention exhibits the unique features of accommodating simultaneously broadband detection over a wide dynamic range and logic gating functions in time coincidence with the input signal.

Obviously many modifications and variations of the present invention are possible in the light of the above teachings. It is therefore to be understood that within the scope of the appended claims the invention may be practiced otherwise than is specifically described.

What is claimed is:

1. A beam switching processor comprising:
   N receiving antenna ports;
   N detector means for receiving N receiving antenna port signals from said N receiving antenna ports and for outputting N detector signals proportional to said N receiving antenna port signals;
   comparator means for receiving said N detector signals, for comparing each of said N detector signals with M reference levels and for providing comparator output signals whenever a detector signal exceeds a reference level;

logic means for receiving said comparator output signals and for providing a coded output signal indicative of which one of said N receiving antenna port signals has the highest signal amplitude;

N transmit antenna ports;

switch means connected to said logic means and to said N transmit antenna ports for enabling energization of one of said N transmit antenna ports corresponding to said receiving antenna port having the highest signal amplitude.

2. The processor of claim 1 wherein said detector means comprises N log amplifiers.

3. The processor of claim 1 wherein said logic means comprises a plurality of NOR gates connected to said comparator means.

4. The processor of claim 3 wherein said logic means further comprises an inverter connected to one of the inputs of each of said NOR gates.

5. The processor of claim 3 wherein said logic means further comprises a plurality of inclusive OR gates connected to said plurality of NOR gates.

6. The processor of claim 5 wherein said switch means is a microstrip switch.

7. The processor of claim 6 wherein said detector means comprises a plurality of log amplifiers.

8. The processor of claim 7 wherein said detector means further comprises N crystal detectors connected to said N receiving antenna ports and to said plurality of log amplifiers.

9. The processor of claim 1 wherein said switch means comprises a plurality of level converters connected to N microstrip switch-drivers.

10. The processor of claim 9 wherein said switch means further includes an N throw microstrip switch connected to said N microstrip switch-drivers.

* * * * *